April 15, 1958  E. S. VIZDOS  2,830,311
VEHICLE WASHER
Filed June 21, 1954  3 Sheets-Sheet 1
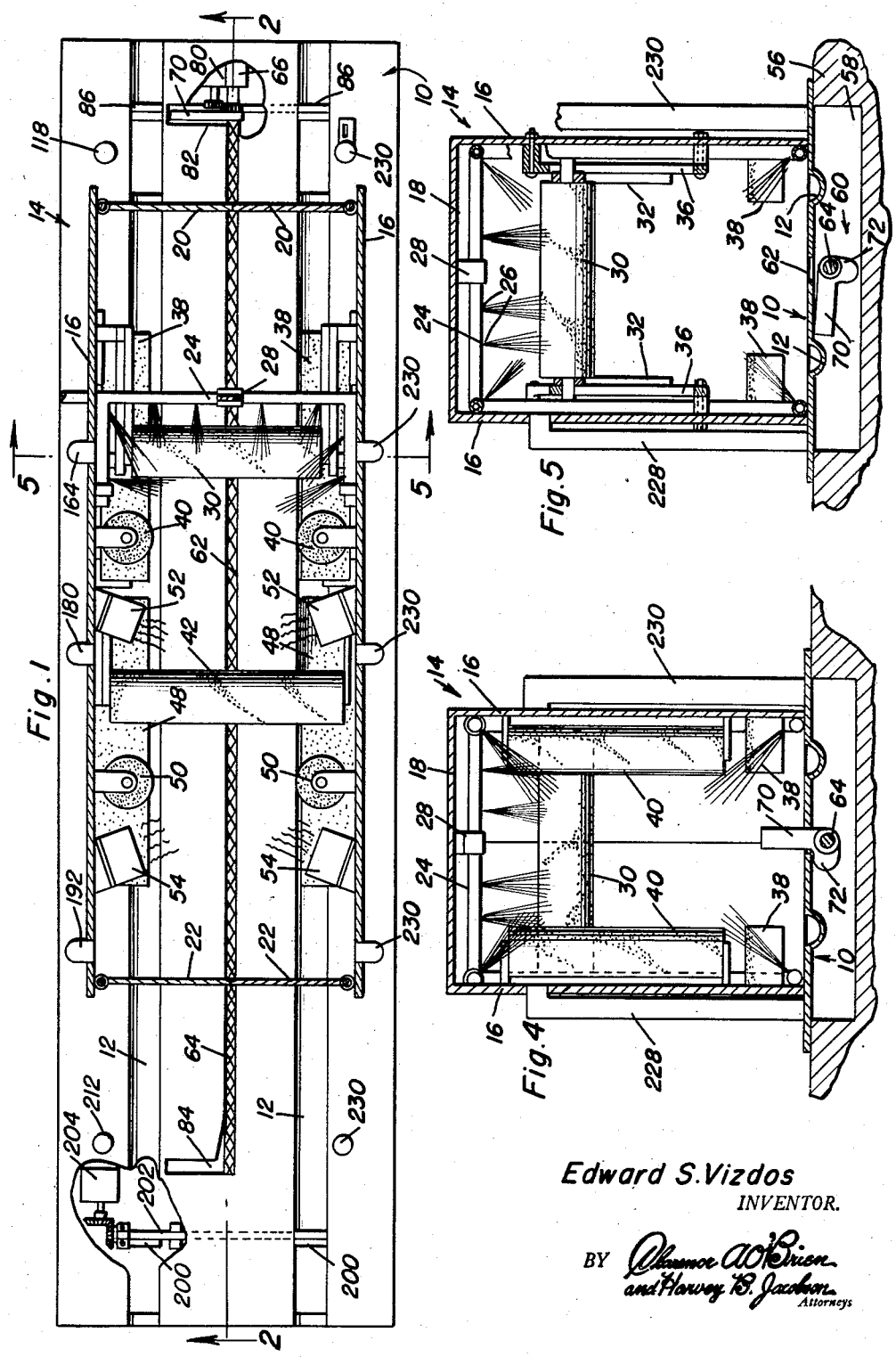
Edward S. Vizdos
INVENTOR.

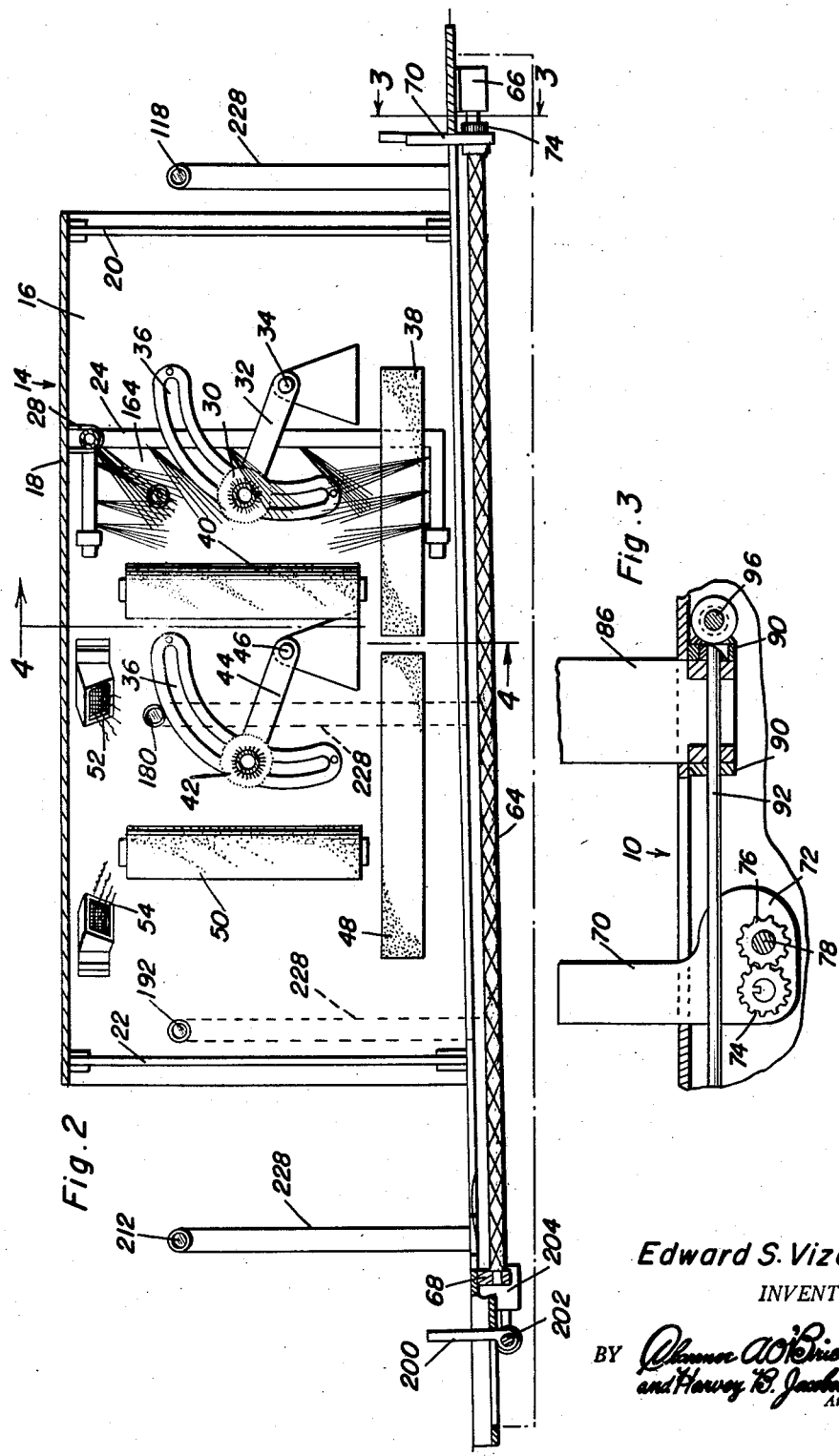

Edward S. Vizdos
INVENTOR.

United States Patent Office 2,830,311
Patented Apr. 15, 1958

2,830,311

VEHICLE WASHER

Edward S. Vizdos, Cleveland, Ohio

Application June 21, 1954, Serial No. 437,940

5 Claims. (Cl. 15—21)

This invention relates in general to improvements in vehicle washers, and more specifically, to an automatic vehicle washer.

The primary object of this invention is to provide a vehicle washer which is so constructed and arranged whereby the operation thereof is entirely automatic once an operator of a vehicle to be washed has initiated the operation thereof.

Another object of this invention is to provide an improved vehicle washer which is so constructed and arranged whereby the operation thereof may be controlled by a single coin controlled switch, whereby the vehicle washer does not require an attendant but may be operated by individual car owners.

Another object of this invention is to provide an improved vehicle transporting device for vehicle washers, the transporting device being automatic in operation in response to proper positioning of a vehicle with respect to the vehicle washer.

A further object of this invention is to provide a vehicle washer which is initially actuated through a coin control mechanism and which has the entire sequence of operation thereof controlled by photoelectric cells.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the vehicle washer which is the subject of this invention, a portion of a housing of the vehicle washer being broken away and shown in section in order to clearly illustrate the arrangement of washing devices mounted within the interior thereof, a portion of the floor of the vehicle washer being broken away in order to show the details of both drive means for a vehicle transporting device and means for controlling the raising and lowering of stop means to prevent further movement of the vehicle once it has been released by the vehicle transporting means;

Figure 2 is a longitudinal vertical sectional view taken substantially upon the plane indicated by the section line 2—2 of Figure 1 and shows the general arrangement of both the vehicle washing device and the vehicle transporting means;

Figure 3 is an enlarged fragmentary vertical sectional view taken substantially upon the plane indicated by the section line 3—3 of Figure 2 and shows the details of both means for operating vehicle stop means at the entrance to the housing of the vehicle washer and the drive means for rotating a vehicle engaging arm from a lowered inoperative position to an upright operative position;

Figure 4 is a transverse vertical sectional view taken substantially upon the plane indicated by the section line 4—4 of Figure 2 and shows the relationship of the vehicle engaging arm with respect to the floor of the vehicle washer as the vehicle engaging arm moves through the housing of the vehicle washer in a car transporting position;

Figure 5 is a transverse vertical sectional view taken substantially upon the plane indicated by the section line 5—5 of Figure 1 and shows the vehicle engaging arm in its lower position as it returns from transporting a vehicle through the housing of the vehicle washer.

Figure 6:
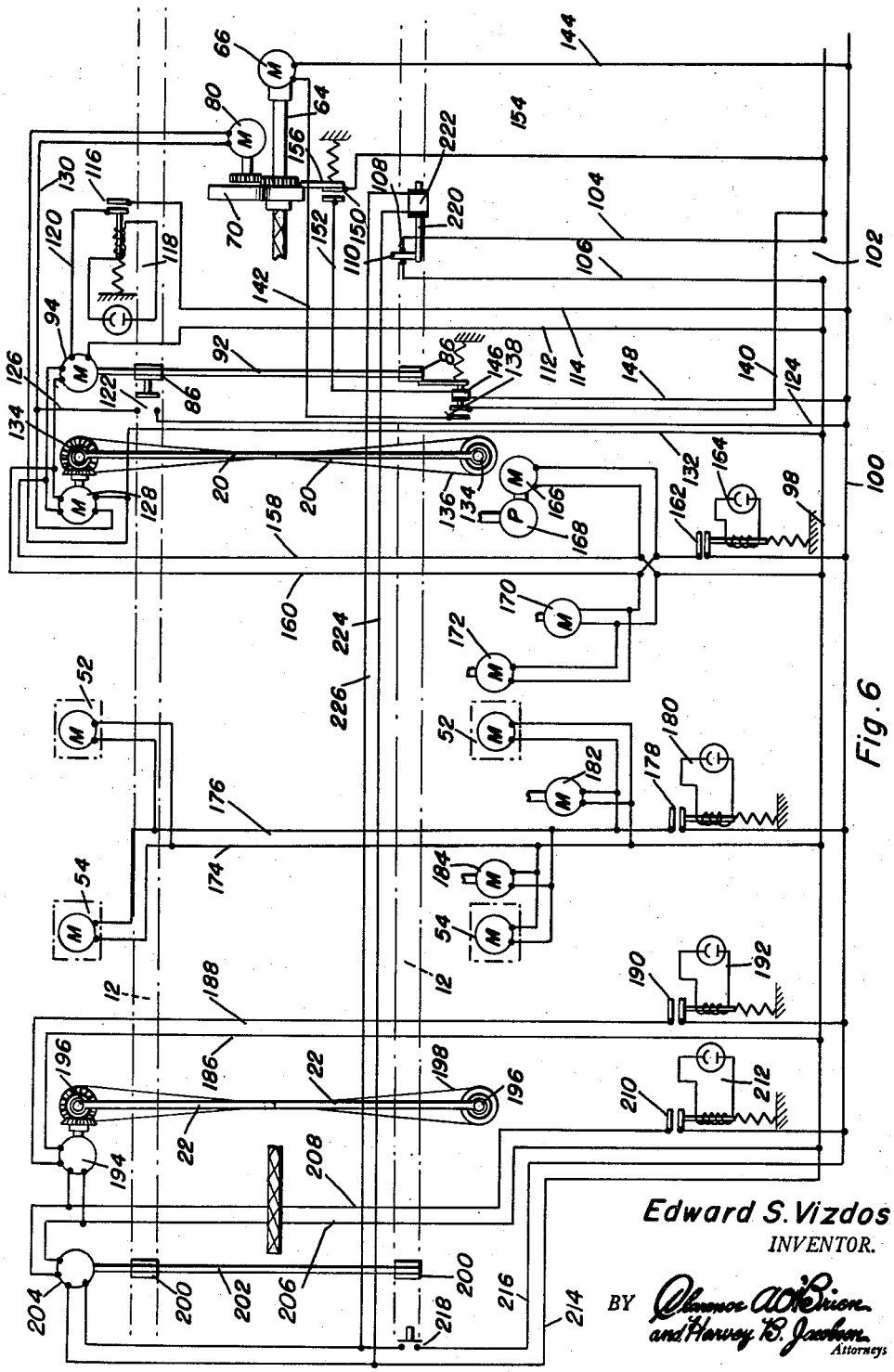
Figure 6 is a wiring diagram for the entire vehicle washer.

Referring now to the drawings in detail, it will be seen that the vehicle washer, which is the subject of this invention, includes an elongated runway which is referred to in general by the reference numeral 10. As is best illustrated in Figure 2, the runway slopes downwardly from one end to the other so that the vehicle to be moved through the vehicle washer will have a tendency to move along the runway when a minimum of pressure is brought to bear against the same to move it through the vehicle washer. In order to facilitate the proper line of movement of a vehicle passing through the vehicle washer, the runway 10 is provided with a pair of vehicle tire receiving recesses 12 which extend the full length of the runway 10.

Overlying the runway 10 intermediate its ends is a housing which is referred to in general by the reference numeral 14. The housing 14 includes a pair of elongated, transversely spaced side walls 16 which are connected at their upper edges by a top wall 18. The entrance end of the housing 14 is closed by a pair of pivotally mounted entrance doors 20. The exit end of the housing 14 is normally closed by a pair of pivotally mounted exit doors 22.

Mounted within the housing 14 adjacent the entrance doors 20 is a U-shaped spray pipe assembly 24. The spray pipe assembly 24 is intended to have passed therethrough a vehicle to be washed, and is provided with a plurality of spray openings or jets 26 so positioned whereby water will be properly sprayed upon the vehicle to be washed. The spray piping 24 is suspended from the top wall 18 by a suitable hanger 28.

Extending transversely of the housing 14 in the same general area as the spray piping 24 is a horizontal washing brush 30 which is carried by a pair of support arms 32 which are pivotally carried by a stub shaft 34. The ends of the brush 30 are mounted in arcuate tracks 36 carried by the side walls 16. It is intended that the brush 30 be a washing brush and it is to engage the hood, windshield, roof and rear deck of a vehicle as it passes through the housing 14. This is made possible by the pivotal mounting of the brush 30.

In order that the lower portions of a vehicle, including the wheels thereof, may be properly scrubbed, there is provided a lower, longitudinally extending brush 38 adjacent each of the side walls 16. Each brush 38 is rigidly mounted and includes resilient bristles so as to permit scrubbing of a vehicle as it passes thereby, with the bristles engaging the vehicle.

Carried by each of the side walls 16 immediately rearward of the spray piping 24 is a vertical washing brush 40. Each of the vertical washing brushes 40 is cylindrical and is rotatably mounted so as to scrub against the side of a vehicle as it passes through the housing 14.

Disposed beyond the brushes 40 is a horizontal brush 42 which is identical with the brush 30. The brush 42 is supported at its ends by a pair of support arms 44 which are pivotally mounted on stub shafts 46. The ends of the brush 42 are engaged in tracks 36 carried by the opposite side walls 16. It is to be understood that the horizontal brush 42 is to be driven for rotation and that it functions in the same manner as the brush 30 with the exception that it is a drying brush.

A fixed horizontal brush 48 is carried by each of the side walls 16 for engaging the lower portions of a vehicle.

The horizontal brushes 48 are longitudinally elongated and are substantially identical with the brushes 38 with the exception that they are drying brushes.

Mounted beyond the horizontal brush 42 is a pair of vertical brushes 50. Each of the vertical brushes 50 is carried by a side wall 16 and is mounted for rotation. It is to be understood that the brushes 50 are motor driven and are intended for drying the sides of a vehicle which has just previously been washed.

In order to facilitate the drying of a vehicle, there is carried by each of the side walls 16 a pair of blowers 52 and 54. The blower 52 is disposed in advance of the horizontal brush 42 and is directed towards the exit doors 22. The blowers 54 are disposed beyond the brushes 50 and are directed generally towards the entrance doors 20.

With the exception of the electrical control means for the various washing and drying devices described above, it is to be understood that these devices are conventional equipment and need not be described in more detail as to their purpose and operation.

It is to be noted that the central part of the runway 10 is disposed above the ground 56 below to provide a space 58 therebeneath. Mounted within the space 58 beneath the runway 10 is a vehicle transporting device which is referred to in general by the reference numeral 60. Extending longitudinally through the runway 10 intermediate the tire receiving grooves 12 is a guideway 62. Directly underlying the guideway 62 is a reversing feed screw 64. The forward end of the feed screw 64 is connected to and supported by an electric drive motor 66. The rear end of the feed screw 64 is suitably supported by a hanger 68.

Carried by the feed screw 64 for movement therealong is a vehicle engaging arm 70. The vehicle engaging arm 70 when in operation transporting a vehicle through the housing 14 projects upwardly through the guide 62, as is best illustrated in Figure 4. However, the arm 70 includes a counterweight 72 which urges it in a counter-clockwise direction, as viewed in Figure 4. Inasmuch as the arm 70 is pivotally carried by the feed screw 64, the counterweight 72 will urge it to a lowered position, such as is best illustrated in Figure 5, once it is free of the guideway 62.

Normally, the vehicle bumper engaging arm 70 is in a lowered or horizontal position. In order to facilitate the pivoting thereof to an upright position, there is secured thereto a gear 74. The gear 74 is meshed with the gear 76 mounted on an armature shaft 78 of an electric motor 80.

Referring now to Figure 1 in particular, it will be seen that the guideway 62 is provided at the forward end thereof with a transversely offset portion 82. The offset portion 82 is normally aligned with the vehicle engaging arm 70 when it is in its at rest position. When the arm 70 is in its at rest position, the gears 74 and 76 are meshed. Then, when the electric motor 80 is actuated, the arm 70 is pivoted to its upright position for movement down through the guideway 62. The electric motor 66 then proceeds to drive the vehicle engaging arm 70 down through the guideway 62 by rotating the feed screw 64.

The guideway 62 is provided at its opposite end with a transverse portion 84. Thus, when the arm 70 reaches the end of the feed screw 64 remote from the electric motor 66, the arm 70 is permitted to swing to a horizontal position due to the urgence of the counterweight 72. At the same time, the arm 70 becomes engaged with the other threads of the feed screw 64 and is automatically urged towards its starting position.

In order to facilitate the initial positioning of the vehicle to be washed by the vehicle washer, there are provided in the forward portions of the tire receiving recesses 12 upright vehicle stops 86. The vehicle stops 86 engage the front wheels of a vehicle so as to prevent the entrance thereof into the housing 14.

Each of the vehicle stops 86 is suitably mounted for pivotal movement between supports 90 carried by the underside of the runway 10. In order that the vehicle stops 86 may be simultaneously actuated, they are connected by a drive shaft 92. Further, operation of the drive shaft 92 is controlled by an electric motor 94 which includes an armature shaft 96 connected to the drive shaft 92 by suitable gearing.

Referring now to Figure 6 in particular, it will be seen that there is illustrated a wiring diagram for the vehicle washer. The electrical system of the vehicle washer includes a pair of power lines 98 and 100. It is to be understood that the power lines 98 and 100 are connected to a conventional electrical source. In order that the operation of the entire vehicle washer may be controlled, the power line 98 is interrupted, as at 102, and has connected to adjacent ends thereof wires 104 and 106 which are connected to a coin control switch 108. The location of the coin control switch 108 will be described in more detail hereinafter. When a coin, such as the coin 110 is mounted in the coin control switch 108, the power line 98 is energized throughout its length.

Connected to the power lines 98 and 100 are wires 112 and 114, respectively. The wire 112 has its opposite end connected to a terminal of the electric motor 94. The wire 114 is connected to a contact of a switch 116 whose operation is controlled by a photoelectric circuit 118. Connecting the other contact of the switch 116 to the electric motor 94 is a wire 120. Thus, when the photoelectric cell 118 is actuated by a vehicle breaking its light source, the electric motor 94 is energized to lower the vehicle stop members 86.

The vehicle stop member 86 has associated therewith a switch or circuit maker 122 of the dashpot type. Connected to one contact of the switch 122 is a wire 124 connected to the power line 100. A wire 126 is connected to the other contact at the switch 122, and is suitably connected to the electric motor 80 and an electric motor 128 through a wire 130. Connecting the electric motors 80 and 128 to the power line 98 is a wire 132. Thus, it will be seen that the electric motors 80 and 128 are energized upon the lowering of the vehicle stop 86.

It is to be pointed out at this time that the entrance doors 20 are mounted on vertical shafts 134 and that the shafts 134 are connected by a belt and pulley arrangement 136 for simultaneous operation. One of the shafts 134 is driven by the electric motor 128 to effect the simultaneous opening of the entrance doors 20 upon the depressing of the vehicle stop 86.

It is to be understood that the switch or circuit maker 122 is closed only a sufficient amount of time to permit the entrance doors 20 to be swung to open positions by the electric motor 128 and the arm 70 swung to an upright position by the electric motor 80. The dashpot system of the switch 122 then permits the breaking of the connection.

Suitably mounted in the runway 10 for actuation by the vehicle stop 86 is a switch 138. The switch 138 has connected thereto a wire 140 which is, in turn, connected to the power line 98 in advance of the interrupted portion thereof. The switch 138 also has connected thereto a wire 142 whose opposite end is connected to the electric motor 66. The electric motor 66 is connected to the power line 100 by a wire 144 so that the circuit to the electric motor 66 will be completed upon the closing of the switch 138. In order to ensure that the switch 138 remains in a closed position until such time as the arm 70 is returned to its starting position, there is provided a holding coil 146 for the switch 138. The holding coil 146 is connected to the power line 100 by a wire 148. The holding coil 146 is connected to a contact of a switch 150 by a wire 152. The switch 150 is normally spring urged to a closed position and has connected to the other contact thereof a wire 154 which is connected to the power line 98 in advance of its interrupted portion.

The switch 150 includes an actuating lever 156 which is selectively engaged by the arm 70.

Connected to the power lines 98 and 100 are wires 158 and 160, respectively. The wire 160 has mounted therein a switch 162 which is controlled by a photoelectric cell 164. Suitably connected to the wires 158 and 160 for controlling by the switch 162 is an electric motor 166 which is connected to a pump 168 for the spray pipes 24. Also, there are connected to the wires 158 and 160 electric motors 170 and 172 for the horizontal brush 30 and the vertical brushes 40, respectively.

The wires 158 and 160 are also suitably connected to the electric motors 128 and 94. Thus, when the switch 162 is closed, the electric motors 94 and 128 are rotated in directions opposite from that described above so that the entrance doors 20 are swung to closed positions and the drive shaft 92 is rotated to effect the elevation of the vehicle stops 86. It is to be understood that the photoelectric cell 164 is mounted within the housing 14 and is actuated only after the vehicle to be washed has cleared the entrance doors 20.

Also connected to the power lines 98 and 100 are wires 174 and 176, respectively. The wire 176 is interrupted by a switch 178 which is controlled by a photoelectric cell 180. Suitably connected to the wires 174 and 176 for controlling by the switch 178 are the blowers 52 and 54. Also, there is connected to the wires 174 and 176 an electric motor 182 for the horizontal brush 42 and an electric motor 184 for the vertical brushes 50.

Also connected to the power lines 98 and 100 are wires 186 and 188, respectively. The wire 188 has mounted therein a switch 190 whose operation is controlled by a photoelectric cell 192. The wires 186 and 188 are connected to an electric motor 194 which is, in turn, drivingly connected to a vertical shaft 196 for one of the exit doors 22. The vertical shaft 196 for the other exit door 22 is connected to the first vertical shaft 196 by a suitable pulley and belt arrangement 198 in the same manner as that described above relative to the entrance doors 20. It will thus be seen that when the switch 190 is closed, the exit doors 22 will be moved to open positions to permit the exit of a vehicle which has now been washed and dried.

After the arm 70 reaches its remote position from the exit end of the housing 14, it drops into the extension 84 of the guideway 62 and the vehicle which has just been washed is released therefrom. In order to prevent further rolling of the vehicle, there is provided a pair of vehicle stops 200 which are mounted in the tire receiving grooves 12. The vehicle stops 200 are connected by a drive shaft 202 which, in turn, is drivingly connected to an electric motor 204. In order to facilitate the automatic depressing of the vehicle stops 200, there are connected to the electric motor 204 wires 206 and 208 which are, in turn, connected to the power lines 98 and 100, respectively. The wire 208 is provided with a switch 210 whose operation is controlled by a photoelectric cell 212.

In order to simultaneously close the exit doors 22 with the depressing of the vehicle stops 200, the electric wires 206 and 208 are connected to the electric motor 194 in such a manner so as to effect a reversal of such electric motor.

After a vehicle has been driven off the runway 10, it is necessary that the vehicle stops 200 be again raised to their vehicle tire engaging positions. In order to accomplish this, there is provided a pair of electric wires 214 and 216 which are connected to the power lines 98 and 100, respectively. The wire 216 is provided with a push-button switch 218 mounted in one of the tire receiving grooves 12. Thus, when a vehicle is driven away, the electric wires 214 and 216 will be energized throughout their length due to the depressing of the plunger of the switch 218. The electric wires 214 and 216 are connected to the electric motor 204 for reverse operation thereof to rotate the drive shaft 202 in such a direction so as to elevate the vehicle stops 200.

The coin 110 disposed in the coin control switch 118 normally rests upon an arm 220. However, the arm 220 is mounted for retraction from beneath the coin 110 and operation thereof is controlled by an electromagnetic device 222. The electromagnetic device 222 is connected to the wires 214 and 216 by wires 224 and 226, respectively. Thus, when the vehicle is driven away from the vehicle washer and the switch 218 is closed, the electromagnetic device 222 is energized to retract the arm 220 and permit the coin 110 to drop into a conventional receptacle (not shown). This will result in the breaking of the circuit to the various drive portions of the vehicle washer.

Although the various photoelectric cells have not been described in detail, it is to be understood that they are to be mounted on suitable support posts 228 along one side of the runway 10. Further, light sources for the photoelectric cells will be mounted on transversely aligned support posts 230 along the opposite edge of the runway 10. The light sources and the photoelectric cells will be connected to the power lines 98 and 100 in the conventional manner.

*Operation*

When it is desired to wash a vehicle with the vehicle washer, the vehicle is driven onto the runway until such time as the front wheels thereof engage the vehicle stops 86. At this time, all of the windows of the vehicle should be wound up and the doors tightly closed. The necessary coin 110 is placed in the coin operated switch 108 to energize the circuit to the vehicle washer. Inasmuch as the vehicle is aligned with the photoelectric cell 118, the electric motor 94 is immediately energized to lower the vehicle stops 86. The lowering of the vehicle stops 86 results in the simultaneous energization of the electric motors 66, 80 and 128. This causes the simultaneous swinging of the entrance doors 20 to open position, the pivoting of the arm 70 to an upright position engaging the front bumper of the vehicle and the driving of the vehicle engaging arm 70 through the guideway 62 to move the vehicle into the housing 14. After the vehicle has completely entered the housing 14, the light source to the photoelectric cell 164 is broken to effect the closing of entrance doors 20 and the movement of the vehicle stops 86 to vehicle wheel engaging positions. Also, the motors 166, 170 and 172 are energized so as to effect the spraying of the vehicle and the scrubbing thereof by the various washing brushes. Next, as the vehicle moves through the housing 14, the light source to the photoelectric cell 180 is broken to effect the operation of the brushes 42 and 50 and the blowers 52 and 54, whereby drying of the vehicle results.

As the vehicle approaches the exit doors 22, the light source to the photoelectric cell 192 is broken so as to energize the electric motor 194 and swing the exit doors 22 to open positions. The vehicle is then moved to the exit opening of the housing 14 until it reaches the point where the arm 70 lowers beneath the runway 10 and the vehicle is released. The owner of the vehicle then re-enters the vehicle and drives it past the photoelectric cell 212 which causes the depressing of the vehicle stops 200. As the vehicle is driven off the runway 10, the control button for the switch 218 is depressed by one of the vehicle wheels to effect both a closing operation of the exit doors 22 and the swinging of the vehicle stops 200 to a vehicle engaging position. The energization of the electrical circuit by the closing of the switch 218 also results in the releasing of the coin 110 to open the electric circuit to a major portion of the vehicle washer. At this time, only the electric motor 66 remains energized. However, it may be that sufficient time has passed that this is also de-energized. The electric motor 66 is automatically de-energized upon the movement of the vehicle engaging arm 70 back to its starting position and the opening of the switch 150 thereby. This results in the releasing of the switch 138 by the holding coil 146 and the opening of the circuit to the electric motor 66.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a vehicle washer including a housing having washing devices mounted therein, said housing having entrance and exit doors, a vehicle transporting device for moving a vehicle through said housing, said vehicle transporting device comprising a vehicle engageable arm, drive means for effecting movement of said arm, operating means for opening said entrance door, control means for said drive means, said control means being operated simultaneously with the operation of said operating means, vehicle stop means in front of said entrance doors, means for lowering said stop means, a vehicle actuated switch controlling the operation of said last mentioned means, and a switch controlled by said vehicle stop means in response to lowering thereof for actuating said operating means and said control means.

2. In combination with a vehicle washer including a housing having washing devices mounted therein, said housing having entrance and exit doors, a vehicle transporting device for moving a vehicle through said housing, said vehicle transporting device comprising a vehicle engageable arm, drive means for effective movement of said arm, operating means for opening said entrance doors, control means for said drive means, said control means being operated simultaneously with the operation of said operating means, a vehicle actuated switch controlling the operation of said operating means and said control means, vehicle stop means disposed beyond said exit door for holding a vehicle released from said arm, second control means for lowering said vehicle stop means, and exit door closing mechanism, said second control means effecting operation of said exit door closing mechanism.

3. The combination with a housing having entrance and exit doors, a vehicle transporting device for moving a vehicle through said housing, said vehicle transporting device comprising a vehicle engageable arm, drive means for effecting the movement of said arm, operating means for opening said entrance door, control means for said drive means, said control means being operated simultaneous with the operation of said operating means, vehicle stop means in front of said entrance door, means for lowering said stop means, a vehicle actuated switch controlling the operation of said last mentioned means, and a switch controlled by said vehicle stop means in response to lowering thereof for actuating said operating means and said control means.

4. A vehicle transportation device for vehicle washers and the like comprising an elongated guideway, a reversible feed screw underlying said guideway, drive means for said feed screw, a vehicle engageable arm threadedly carried by said feed screw for movement therealong, means at one end of said guideway for aligning said arm with said guideway, an open space beneath said guideway for the passage of said arm, said guideway engaging said arm to retain said arm in an upright position during one direction of travel only.

5. A vehicle transportation device for vehicle washers and the like comprising an elongated guideway, a reversible feed screw underlying said guideway, drive means for said feed screw, a vehicle engageable arm threadedly carried by said feed screw for movement therealong, means at one end of said guideway for aligning said arm with said guideway, an open space beneath said guideway for the passage of said arm, said guideway engaging said arm to retain said arm in an upright position during one direction of travel only, the last mentioned means including temporarily meshing gear means between said arm and a drive unit.

References Cited in the file of this patent

UNITED STATES PATENTS

| Number | Name | Date |
| --- | --- | --- |
| 428,639 | Siccardi | May 27, 1890 |
| 687,033 | Kester | Nov. 19, 1901 |
| 1,448,057 | Denehie | Mar. 13, 1923 |
| 1,896,543 | Gfrorer | Feb. 7, 1933 |
| 2,052,911 | Weathers | Sept. 1, 1936 |
| 2,490,921 | Rousseau | Dec. 13, 1949 |
| 2,579,866 | Rousseau | Dec. 25, 1951 |
| 2,622,543 | Rousseau | Dec. 23, 1952 |